A. LOW.
GARDEN HOSE CARRIAGE.
APPLICATION FILED AUG. 13, 1909.
957,569.
Patented May 10, 1910.
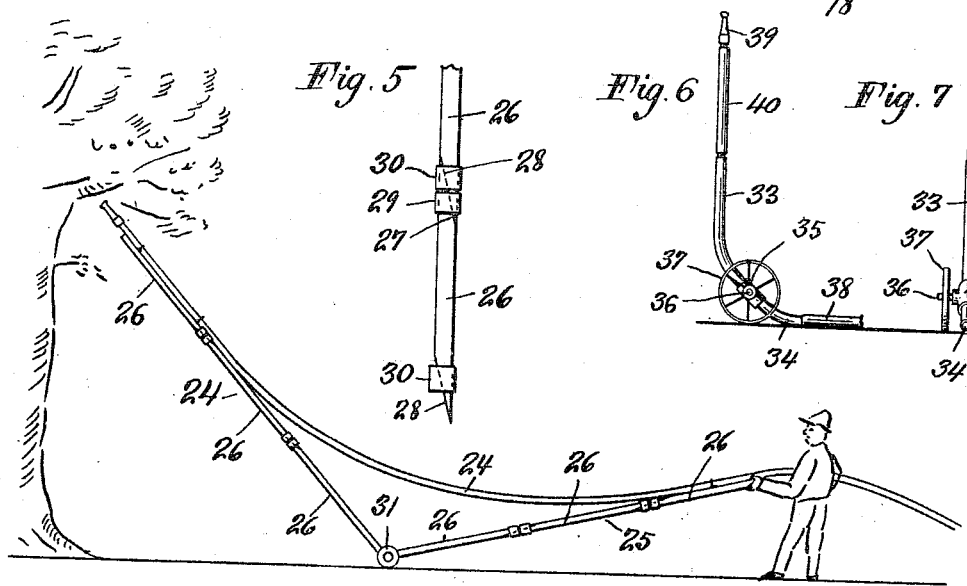

UNITED STATES PATENT OFFICE.

ANDREW LOW, OF NEWARK, NEW JERSEY.

GARDEN-HOSE CARRIAGE.

957,569.  Specification of Letters Patent.  Patented May 10, 1910.

Application filed August 13, 1909. Serial No. 512,656.

*To all whom it may concern:*

Be it known that I, ANDREW LOW, a citizen of the United States of America, and a resident of Newark, Essex county, New Jersey, have invented certain new and useful Improvements in Garden-Hose Carriages, of which the following is a specification.

This invention relates to garden hose carriages and has for its objects to provide a suitable portable support for a garden hose, when the same is being used, in such a manner that the hose may be handled with convenience and without danger of the operator becoming wet from the spray.

Another object is to provide means for elevating the spray from the ground so as to cover a greater area with the nozzle.

In the accompanying drawing I have illustrated several forms in which my invention may be embodied, but it will be understood that other forms may be used and I claim all such changes as properly come within the invention and the claim.

In the said drawings Figure 1 is a side elevation of a hose carriage embodying my invention. Fig. 2 is an end view of the carriage. Fig. 3 is a detail view of the hose fastening means. Fig. 4 shows a form of carriage intended for use when spraying trees with chemicals to prevent their destruction by insects. Fig. 5 is a detail view of parts of the adjustable carriage members and Figs. 6 and 7 show a modification.

In the several views the reference character 7 denotes an axle member provided with the axles 8 which carry the wheels 9, which may be kept on the axles by means of pins 10. To the axle member is fastened in any suitable manner the upright supporting member 11 provided with the holes 12 and a loop 13 which preferably may be made of thin sheet metal nailed to the support 11 which preferably is made of wood as are the principal parts of the carriage.

14 represents an extension member provided with a hole 15 and a loop 16 similar to the loop 13. The two members 11 and 14 are preferably made alike and the loops are so arranged that the lower loop 16 fast on the member 14 envelops the upright 11 with a sliding fit and in the same manner the loop 13 fast on the member 11 envelops the member 14. By these means the member 14 is adapted to slide vertically on the upright 11 to increase the height of the vertical supporting means. A pin 17 may be passed through one of the holes 12 and the hole 15 to lock the two members together as is obvious and easily seen from the drawing.

Suitably fastened to the axle member is a tail 18 forming an obtuse angle with the upright support so as to keep the latter vertical when the tail rests on the ground. The extension 14 and the tail are each provided with fastening means each of which comprises a hook 19 and an eye 20 to which latter is fastened a chain 21 having the two rings 22 and 23.

24 represents a garden hose. The method of fastening the hose to the supports is illustrated in Fig. 3. The chain 21 is just long enough to pass around the hose and to enable the ring 22 to hook over the hook 19. Hence the necessity for the ring 23 which serves as a handle with which to pull the chain taut over the hose so as to snap the ring 22 over the hook. In this manner the hose is quickly and easily, yet firmly, fastened to the carriage.

When sprinkling a lawn the carriage with the hose may be left standing in any place while the water is turned on and the hose need not be constantly operated. Further by raising the nozzle the spray will cover a greater area. On the other hand the carriage is easily moved about without the operator getting so close to the spray as to become wet.

In Fig. 4 I have illustrated a hose carriage in which both the upright 24 and the tail 25 are adjustable lengthwise. As shown each of the members comprises sections 26 provided with bevels 27 and 28 pointing in opposite directions. Each section is further provided with the loops 29 and 30. Fig. 5 shows in detail how the sections are joined by means of these loops, the opposed bevels 27 and 28 being brought together within the loops. By these means the operator may obtain hold on the device and direct the spray, on a tree for instance, without getting inside the area of the spray. The device is mounted on wheels 31 so as to be easily portable and to assist in directing the spray. Suitable fastening means as above set forth or otherwise may be used to secure the hose to this form of carriage.

In Figs. 6 and 7 is shown a device intended to be made of standard pipe and fittings and at the same time embodying the features set forth above. As shown the device in this instance comprises an upright 33 and a tail 34 joined by a four-way connection marked 35. The two horizontal arms of this connection are plugged up by rods 36 which support the wheels 37. The hose 38 is slipped over the end of the tail and the nozzle 39 may either be screwed on the end of the upright 33 or an extension member may be employed to increase the height of the nozzle. Such extension piece is shown and marked 40. In Fig. 7 the nozzle and the extension piece are omitted.

The above is thought to fully explain this invention and it will be observed that by reason of the portability and the adjustments the hose may be directed and supported in various directions as needed.

I claim:—

A hose carriage of the character described comprising an axle member, wheels thereon, an upright support fast on said axle member, a loop fast on the said support at its upper end, an extension member fitted to slide within the said loop, a second loop fast on the said extension member and fitted around the said upright support, the said second loop forming means for preventing the withdrawal of the said extension member from the said support, means for adjusting the extension member on the said support, a tail member fast on the said axle member at an angle to keep the said support vertical and hose fastening means, comprising chains and hooks at the top and the bottom of the said extension member and on the free end of the said tail member.

Signed at New York, N. Y. this 12th day of August 1909.

ANDREW LOW.

Witnesses:
 IVAN KONIGSBERG,
 M. M. RIEMANN.